United States Patent

[11] 3,597,550

[72] Inventor Olaf Sternbeck
Persikogatan 64, Vallingby, Sweden
[21] Appl. No. 786,994
[22] Filed Dec. 26, 1968
[45] Patented Aug. 3, 1971
[32] Priority Jan. 18, 1968
[33] Sweden
[31] 661/68

[54] BALANCED TELEPHONE INSTRUMENT CIRCUIT
1 Claim, 1 Drawing Fig.

[52] U.S. Cl. .......... 179/81 A
[51] Int. Cl. .......... H04m 1/58
[50] Field of Search .......... 179/81 A, 170 NHC

[56] References Cited

UNITED STATES PATENTS

| | | | |
|---|---|---|---|
| 3,170,043 | 2/1965 | Hohmann | 179/81 A |
| 3,227,812 | 1/1966 | Schlichte | 179/81 A |
| 3,453,394 | 7/1969 | Linse | 179/81 A |
| 3,453,395 | 7/1969 | Englund | 179/81 A |

*Primary Examiner*—William C. Cooper
*Assistant Examiner*—William A. Helvestine
*Attorney*—Hane & Baxley

ABSTRACT: A balanced telephone circuit includes a microphone connected to the input of a transistor amplifier means having two same-phased outputs and a common output. One of the two same-phased outputs is connected to a first wire of a subscriber's line. The telephone receiver is connected across the first wire of the subscriber's line and the other of the same-phased outputs. An artificial load is connected across the other of the same-phased outputs and the second wire of the subscriber's line which is connected to the common output.

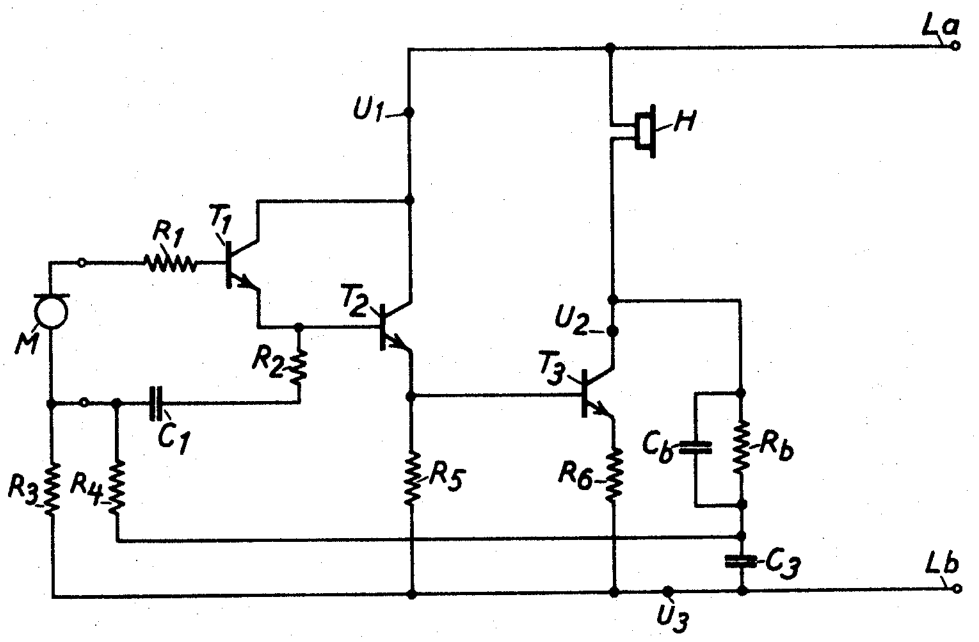
INVENTOR
OLAF STERNBECK
BY Hane and Baxley
ATTORNEYS

BALANCED TELEPHONE INSTRUMENT CIRCUIT

The present invention relates to a balanced telephone instrument circuit of the kind that comprises a microphone, a telephone receiver, an amplifier for the microphone and a subscriber's line.

In such instrument circuits it is common to have a balance transformer for eliminating the influence on the telephone receiver of signals generated in its own microphone. For production technical reasons it is advantageous to be able to do without the balance transformer. According to the present invention this is possible if the instrument circuit is realized in accordance with the characteristics of the following claims.

The invention will be described in greater detail with reference to the accompanying drawing showing a telephone instrument circuit according to the invention.

In the drawing reference M denotes a microphone, reference $T_1$-$T_2$-$T_3$ denotes an amplifier for the microphone M, reference H denotes a telephone receiver, reference $R_b$-$C_b$ denotes an artificial load and reference $L_a$-$L_b$ denotes a subscriber's line. The microphone amplifier $T_1$-$T_2$-$T_3$ comprises three transistors $T_1$, $T_2$ and $T_3$ each having one emitter resistor $R_2$, $R_5$ and $R_6$ respectively. The microphone M is connected via resistor $R_1$ to the base of the transistor $T_1$ and via a capacitor $C_1$ and the resistor $R_2$ to the emitter of the transistor $T_1$, which emitter is directly connected to the base of the transistor $T_2$. The connection point between the capacitor $C_1$ and the microphone M is connected via a resistor $R_3$ and moreover via a resistor $R_4$ and a capacitor $C_3$ connected to one part $L_b$ of the subscriber's line. The emitter of the transistor $T_2$ is directly connected to the base of the transistor $T_3$ and is connected to the part $L_b$ of the line via the resistor $R_5$, while its collector is connected to an output terminal $U_1$ which is in turn connected to the other part $L_a$ of the subscriber's line. The emitter of the transistor $T_3$ is connected to the part $L_b$ of the line via the resistor $R_6$ and its collector is connected to a second output terminal $U_2$ which is in turn connected to the part $L_a$ of the line via the telephone receiver H. The telephone receiver H and the artificial load $R_b$-$C_b$ constitute a series connection which via the capacitor $C_3$ is connected between the parts $L_a$ and $L_b$ of the subscriber's line. The output terminals $U_1$ and $U_2$ can be said to constitute two output terminals which, seen from the outside, are independent of each other and which carry signals of the same phase, while a third output terminal $U_3$ on the microphone amplifier is connected to the part $L_b$.

The purpose of capacitor $C_b$, which is in parallel with the resistor $R_b$ is to imitate the subscriber's line $L_a$-$L_b$, which is generally capacitive. This capacitor may be excluded. The balance resistor $R_b$ constitutes the alternating current load of the transistor $T_3$.

As examples the following values are given for the units shown in the drawing.

| | | | | | |
|---|---|---|---|---|---|
| $R_1$ | 300 Ω | $R_5$ | 100 Ω | $C_1$ | 10 μf. |
| $R_2$ | 0–1000 Ω | $R_6$ | 100 Ω | $C_b$ | 0.15 μf. |
| $R_3$ | 100.10³ Ω | $R_b$ | 300 Ω | $C_3$ | 6 μf. |
| $R_4$ | 56.10³ Ω | | | | |

In the amplifier shown as an example the transistor $T_1$ works as a common amplifier for the output transistors $T_2$ and $T_3$. The detailed way of controlling the output transistors $T_2$ and $T_3$ can be modified in many ways. The transistors $T_2$ and $T_3$ are arranged to emit an alternating current component in their collector current of the same phase. The condition for balance across the telephone receiver is that the product of the current from the terminal $U_1$ multiplied by the line impedance is equal to the product of the current from the terminal $U_2$ multiplied by the impedance of the artificial load. In reality this can only be approximately fulfilled because of variations in the line impedance. By suitably choosing the relation between the alternating currents from outputs $U_1$ and $U_2$ and by choosing suitable values for resistor $R_b$ and $C_b$ capacitor and for the impedance in the telephone receiver apart from balance a desired instrument impedance, seen from the line, may also be obtained.

The microphone M has a DC resistance of typically less than 600 ohms. The microphone signal is amplified by the transistors $T_1$ and $T_2$. The DC bias current of transistor $T_1$ is supplied by the voltage divided network of resistors $R_3$ $R_4$. Part of the amplified signal voltage appears across the resistor $R_5$ which also provides DC bias to transistor $T_3$. The function of the resistor $R_2$ is to limit the amplification of the amplifier comprising transistors $T_1$ and $T_2$ by negative feedback. Thus the part of the amplifier in front of transistor $T_3$ constitutes a conventional signal amplifier. The balance current transistor $T_3$ receives its bias and signal currents from the emitter of transistor $T_2$. The resistors $R_5$ and $R_6$ being of similar magnitude, the collector current of transistor $T_3$ contains a signal current of the same phase as that of transistor $T_2$ and of similar magnitude. Balance, i.e., no signal current through the earphone H, is thus achieved, as explained elsewhere, for a certain ratio of line impedance and balance impedance ($C_b$, $R_b$), dependent upon the ratio of transistor collector signal current of the transistors $T_1$ and $T_2$ versus the collector signal current of transistor $T_3$. The earphone H has a typically low DC resistance and the capacitors $C_1$ and $C_3$ low impedances for the signal current.

I claim:

1. A balanced telephone instrument circuit for connection to a subscriber line having at least two wires, said circuit comprising: a microphone for generating voice signals; a transistor amplifier means comprising at least two transistors of the same type, each having a collector terminal, an emitter terminal and a base terminal; means for applying the same-phase of signal from said microphone across the base and emitter terminals of said transistors; a common output connected to one wire of said subscriber line; means for connecting the emitter terminals of said transistors to said common output; means for connecting the collector terminal of one of said transistors to the other wire of said subscriber line; a telephone receiver connecting the collector terminal of the other of said transistors to said other wire of said subscriber line; and an artificial load connected between the collector terminal of said other of said transistors and said common output.